(12) United States Patent
Whitney et al.

(10) Patent No.: US 9,073,545 B2
(45) Date of Patent: Jul. 7, 2015

(54) DIESEL ENGINE STEADY STATE AND TRANSIENT HYBRID OPTIMIZATION

(71) Applicant: GM GLOBAL TECHNOLOGY OPERATIONS LLC, Detroit, MI (US)

(72) Inventors: Christopher E. Whitney, Commerce, MI (US); Luca Scavone, Moncalieri (IT); Anthony H. Heap, Ann Arbor, MI (US); Cornelius Heisler, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 13/950,864

(22) Filed: Jul. 25, 2013

(65) Prior Publication Data

US 2015/0032308 A1    Jan. 29, 2015

(51) Int. Cl.
*B60W 20/00* (2006.01)
*B60W 10/06* (2006.01)
*B60W 10/08* (2006.01)
*F02D 41/00* (2006.01)

(52) U.S. Cl.
CPC ........... *B60W 20/1082* (2013.01); *B60W 10/06* (2013.01); *B60W 10/08* (2013.01); *F02D 41/0002* (2013.01); *F02D 2041/0017* (2013.01); *F02D 2041/0022* (2013.01); *Y10S 903/93* (2013.01)

(58) Field of Classification Search
CPC ............ F02D 41/1497; F02D 41/0002; F02D 2200/0625; F02D 2250/18; F02D 2250/36; F02D 2041/0017; F02D 2041/0022; B60W 10/06; B60W 20/1082; B60W 10/08; Y10S 903/93
USPC .............. 701/22; 180/65.23, 65.265; 903/930
See application file for complete search history.

(56) References Cited

U.S. PATENT DOCUMENTS 6,307,277 B1 * 10/2001 Tamai et al. ................. 290/40 C
2009/0012665 A1 * 1/2009 Brennan et al. ................. 701/22

* cited by examiner

*Primary Examiner* — Marthe Marc-Coleman

(57) ABSTRACT

A method for selecting an engine operating point in a multi-mode powertrain system includes monitoring a desired axle torque based on an operator torque request and vehicle speed. For each available combustion mode of the diesel engine, engine torque and speed ranges are received and a plurality of fuel losses and a plurality of emissions losses are retrieved, each fuel and emissions loss corresponding to respective ones of a plurality of engine operating points within the engine torque and speed ranges. The respective fuel and emissions losses are compared at each of a plurality of potential engine operating points within the engine torque and speed ranges of the available combustion modes. A desired engine operating point within one of the available combustion modes is selected that corresponds to one of the potential engine operating points having a lowest power loss based on the compared respective fuel and emissions losses.

19 Claims, 7 Drawing Sheets

DIESEL ENGINE STEADY STATE AND TRANSIENT HYBRID OPTIMIZATION

TECHNICAL FIELD

This disclosure is related to a diesel engine employed in a hybrid powertrain system.

BACKGROUND

The statements in this section merely provide background information related to the present disclosure. Accordingly, such statements are not intended to constitute an admission of prior art.

A powertrain includes a torque generative device providing torque to a rotating member. A hybrid powertrain utilizes at least two torque generative devices, for example an internal combustion engine and one or more electric machines. A hybrid transmission is employed and configured to selectively receive and transmit torque through the various gear members and change gear states to establish a relationship between a rotational input to the transmission and a rotational output of the transmission.

It is known to employ diesel combustion engines due to their ability to produce desirable torque utilizing air-fuel ratios that are lean of stoichiometry. While the lean air-fuel ratios provide increased fuel economy compared to gasoline engines, emissions efficiency is reduced due to increased levels of NOx and hydrocarbons output from the diesel engine. Accordingly, if the diesel engine is optimized to obtain the greatest fuel efficiency, increased levels of emissions may result. Additionally, fuel economy can be reduced indirectly if aftertreatment systems require frequent cleaning and regeneration.

It is known to optimize the impact of emissions in diesel engines by maintaining an optimal or desired air-fuel ratio. Because an injected fuel mass is established to meet a desired axle torque requested by an operator of a vehicle, intake air mass must be adjusted to maintain the desired air-fuel ratio for a specific engine operating point. One drawback of maintaining the desired air-fuel ratio to meet emissions standards is that drivability can be sacrificed due to a time delay associated with adjusting the intake air mass through delays in adjusting levels of exhaust gas recirculation, turbocharging, and/or throttle opening.

SUMMARY

A method for selecting an engine operating point in a multi-mode powertrain system includes monitoring a desired axle torque based on an operator torque request and vehicle speed. For each available combustion mode of the diesel engine, engine torque and speed ranges are received and a plurality of fuel losses and a plurality of emissions losses are retrieved, each fuel and emissions loss corresponding to respective ones of a plurality of engine operating points within the engine torque and speed ranges. The respective fuel and emissions losses are compared at each of a plurality of potential engine operating points within the engine torque and speed ranges of the available combustion modes. A desired engine operating point within one of the available combustion modes is selected that corresponds to one of the potential engine operating points having a lowest power loss based on the compared respective fuel and emissions losses.

BRIEF DESCRIPTION OF THE DRAWINGS

One or more embodiments will now be described, by way of example, with reference to the accompanying drawings, in which.

DETAILED DESCRIPTION

Figure 1:
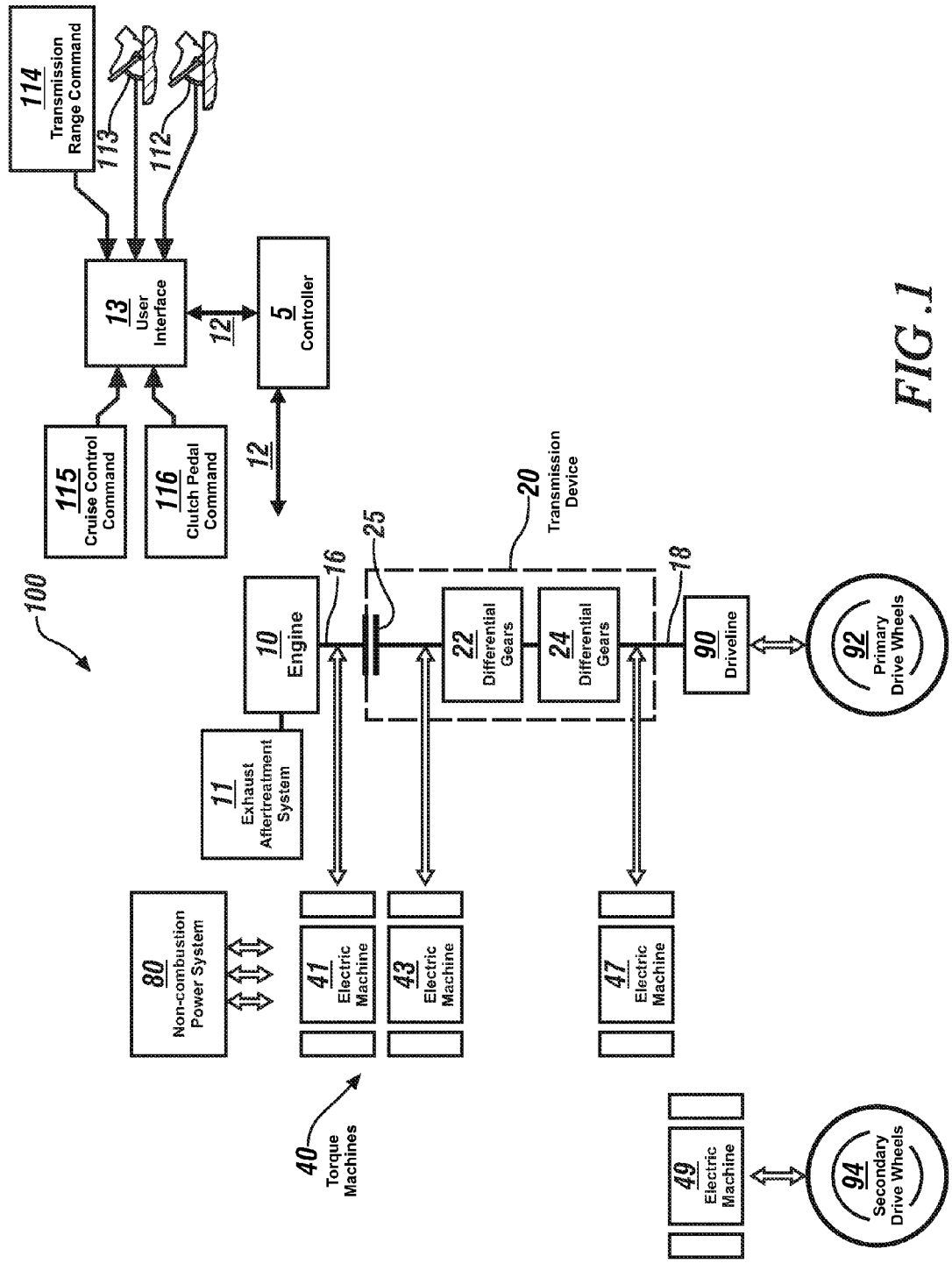
FIG. 1 illustrates a multi-mode powertrain system employing a power-split configuration including a diesel engine, one or more non-combustion torque machines, a transmission device, an energy storage device, a driveline, and a controller, in accordance with the present disclosure.

Referring now to the drawings, wherein the showings are for the purpose of illustrating certain exemplary embodiments only and not for the purpose of limiting the same, FIG. 1 depicts a multi-mode powertrain system 100 employing a power-split configuration including a diesel engine 10, one or more non-combustion torque machine(s) 40, a transmission device 20, a non-combustion power system 80, a driveline 90, and a controller 5. The transmission 20 mechanically couples to the diesel engine 10, the torque machine(s) 40, and the driveline 90. In one embodiment, the torque machine(s) are electric machines capable of acting as motors and generators and the non-combustion power system 80 is a high-voltage electrical system. Alternate non-combustion power systems may be employed with similar effect, such non-combustion power systems including, e.g., pneumatic power systems, hydraulic power systems, and mechanical power systems. FIG. 1 shows alternate arrangements for the powertrain system 100 employing the diesel engine 10 and torque machine (s) 40 as propulsion devices, with the diesel engine 10 and torque machine(s) 40 configured to transfer torque to a single output member 18 to provide tractive torque to the driveline 90 including axle(s) coupled to primary drive wheels 92 and/or secondary drive wheels 94. The non-combustion torque machine(s) include one or more electric machines 41, 43, 47 and 49. The driveline 90 includes the primary drive wheels 92 that mechanically couple via differential gearing or a transaxle to another suitable device to an output member of the transmission 20 to generate tractive torque. The driveline includes the secondary drive wheels 94 that may couple to one of the torque machine(s) 40 to generate tractive torque.

The diesel engine 10, a compression-ignition engine, includes multiple cylinders operative in several combustion modes to transfer torque to the transmission device 20 via the single input member 16. Exhaust gas flow from a combustion event enters an exhaust aftertreatment system 11. The exhaust aftertreatment system 11 can include any combination of a diesel oxidation catalyst (DOC), a lean NOx trap (LNT) device, a diesel particulate filter (DPF) device, and a selective catalytic reduction (SCR) device. A speed-load operating point of the diesel engine 10 can be controlled by actuators to control combustion parameters in the plurality of combustion modes including intake mass airflow (i.e., intake air mass) including turbo charging, throttle opening, fuel mass and injection timing, spark-assist, exhaust gas recirculation (EGR), and intake and/or exhaust valve timing and phasing. The torque machine(s) 40, including one or more electric machines 41, 43, 47 and 49, preferably include multi-phase alternating current electric machines, each including a stator and a rotor that employ electric energy to generate and react torque. The diesel engine 10 mechanically couples to the transmission device 20 preferably via an interface device 25, which can be a torque converter or a clutch device.

The transmission device 20 includes one or more differential gears, shafts, belts, clutches an other elements to transfer torque between the single input member 16 and the single output member 18. The transmission device 20 is referred to herein as a passive transmission because it does not include any internal devices that generate propulsion torque, e.g., electric machines. In one embodiment, the transmission device 20 is a fixed-ratio mechanical device having the input and output members 16, 18, respectively, and differential gears 22 and 25, configured to transfer torque among the diesel engine 10, the torque machine(s) 40, and the driveline 90 in one of a plurality of fixed-gear states. Thus, one or more of the torque(s) is rotatably coupled to either the input member or the output member for torque transfer. Each fixed-gear state includes a ratio of transmission input speed to transmission output speed. Fixed-gear ratios have graduated step increases from a relatively small value to a large value with increasing fixed-gear state from a low gear to a higher gear, including an overdrive state, wherein the transmission output speed is greater than the transmission input speed. The transmission device 20 may be configured as an automatic transmission to automatically shift between the fixed-gear ratio states using a predetermined control scheme. Alternatively, the passive transmission 20 may be configured as a manual transmission to manually shift between the fixed-gear ratio states in response to an operator-initiated shift request that may include manipulation of a shift lever and a clutch pedal. Alternatively, the transmission device 20 may be configured as a continuously-variable transmission having a single input member and single output member that transfers torque among the engine 10, the torque machine(s) 40, and the driveline 90 in a continuously variable ratio that is controllable.

When the powertrain system 100 employs a first electric machine P1 41, it mechanically couples to and turns with a crankshaft of the diesel engine 10. The mechanical coupling may include a belt drive coupling (BAS) or a direct drive coupling (FAS). When the powertrain system 100 employs a second electric machine P2 43, it mechanically couples to and turns with an input member of the transmission 20, including coupling to a gear member of a differential gear set thereof. When the powertrain system 100 employs a third electric machine P3 47, it mechanically couples to and turns with the output member of the transmission 20, including coupling to a gear member of a differential gear set thereof. When the transmission device employs a fourth electric machine P4 49, it mechanically couples to and turns with the secondary drive wheels 94.

The powertrain system 100 may employ an individual one of the electric machines 41, 43, 47, and 49. In one embodiment, the first electric machine P1 41 is employed. The powertrain system 100 may employ combinations of the torque machines(s) 40, i.e., combinations of the electric machines 41, 43, 47 and 49. In one embodiment, the first electric machine P1 41 is employed in combination with the second electric machine P2 43. In another embodiment, the first electric machine P1 41 is employed in combination with the third electric machine P4 49. Other suitable combinations may be employed.

The high-voltage electrical system 80 includes an electrical energy storage device (ESD) electrically coupled to an inverter module via a high-voltage bus. The inverter module transfers electric power between the ESD and the torque machine(s) 40 in response to commands from the controller 5. The ESD includes suitable devices for monitoring electric power flow including current and voltage monitoring systems. The ESD can be any suitable high-voltage electrical energy storage device, e.g., a high-voltage battery, and preferably includes a monitoring system that provides a measure of electrical power supplied to the high-voltage bus, including voltage and electric current.

The ESD couples to the inverter module via high-voltage bus that preferably includes a contactor switch that permits or prohibits flow of electrical current between the ESD and the inverter module. The inverter module preferably includes power inverters and respective motor control modules configured to receive torque commands and control inverter states therefrom for providing motor drive or regeneration functionality to meet the motor torque commands. The power inverters include complementary multi-phase power electronics devices, and each includes a plurality insulated gate bipolar transistors for converting DC power from the ESD to AC power for power one of the torque machine(s) 40 by switching at high frequencies. The insulated gate bipolar transistors form a switch mode power supply configured to receive control commands. Each phase of each of the multi-phase electric machines a pair of insulated gate bipolar transistors. The three-phase inverters receive or supply direct current (DC) electric power via DC transfer conductors and transform it to, or from, three-phase alternating current (AC) power, which is conducted to, or from, the torque machine(s) 40 through the power inverters and respective motor control modules in response to the motor torque commands. Electric current is transmitted across the high-voltage bus to charge and discharge the ESD.

The controller 5 signally and operatively links to various actuators and sensors in the powertrain system via a communications link 12 to monitor and control operation of the powertrain system 100, including synthesizing information and inputs, and executing routines to control actuators to meet control objectives related to emissions, fuel economy, performance, drivability, and protection of hardware, including batteries of the ESD and the torque machine(s) 40. The controller 5 is a subset of an overall vehicle control architecture, and provided coordinated system control of the powertrain system 100. A user interface 13 is preferably signally connected to a plurality of devices through which a vehicle operator directs and commands operation of the powertrain system 100. The commands preferably include an accelerator pedal command 112, brake pedal command 113, transmission range command 114, vehicle speed cruise control command 115, and clutch pedal command 116 when the transmission device 20 is configured as a manual transmission. The transmission range command 114 may have a discrete number of operator-selectable positions (PRNDL). The user interface 13 may include a single interface device, as shown or alternatively may include a plurality of user interface devices directly connected to individual control modules. Operator inputs preferably including an output torque request determined via the accelerator pedal command 112, brake pedal command 113 and vehicle speed cruise control command 115, and a selected transmission range determined via the transmission range command 114.

The controller 5 preferably includes a distributed control module system that includes individual control modules including a supervisory hybrid control module (HCP), transmission control module (TCM), and engine control module (ECM). The high-voltage electrical system 80 including a battery pack control module coupled to the ESD and the inverter module. The aforementioned control modules communicate with other control modules, sensors, and actuators via the communications link 12, which effects structured communications between the various control modules. The specific communications protocol is application-specific. The communications link 12 and appropriate protocols provide for robust messaging and multi-control module interfacing between the aforementioned control modules and other control modules providing functionality including, e.g., antilock braking, traction control, and vehicle stability. Multiple communications buses may be used to improve communications speed and provide some level of signal redundancy and integrity, including direct links and serial peripheral interface (SPI) buses. Communications between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
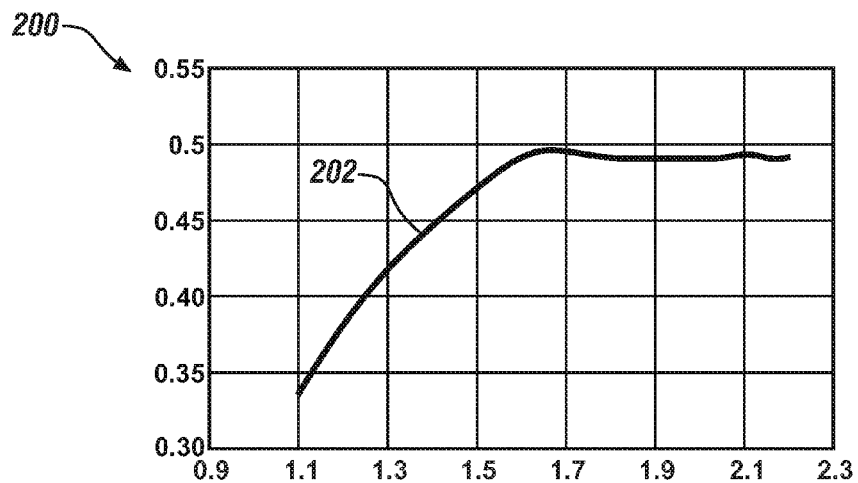
FIG. 2 illustrates an exemplary plot of fuel efficiency versus air-fuel ratio in a diesel engine, in accordance with the present disclosure.

FIG. 2 illustrates an exemplary plot 200 of fuel efficiency versus lambda, in accordance with the present disclosure. As used herein, the term "lambda," describes an air-fuel ratio used for combustion in a diesel engine. Lambda values greater than 1.0 are lean of stoichiometry and lambda values less than 1.0 are rich of stoichiometry. The plot 200 includes fuel efficiency along the vertical y-axis and lambda along the horizontal x-axis. The fuel efficiency is a ratio of energy/torque output. In the illustrated example, a fuel efficiency profile 202 is relatively flat until reaching a lambda value of about 1.6. The fuel efficiency profile 202 begins to decrease for lambda values less than 1.6. In other words, the fuel efficiency decreases as the air-fuel ratio becomes more rich for lambda values less than about 1.6. As the fuel efficiency decreases, undesirable particles are generated. A smoke limit is also included along the decreasing fuel efficiency profile 202. In a non-limiting example, the smoke limit can include a lambda value of about 1.1. It will be appreciated that an injected fuel mass is determined by a desired torque and speed output from the engine (e.g., desired engine operating point) and the combustion mode the diesel engine is operating in. Intake air mass is adjusted to achieve an optimal lambda value based on the selected injected fuel mass to achieve the desired torque output from the diesel engine. In the illustrated example, lambda values greater than 1.6 can be selected as an optimal lambda for achieving the best fuel economy.

Figure 3:
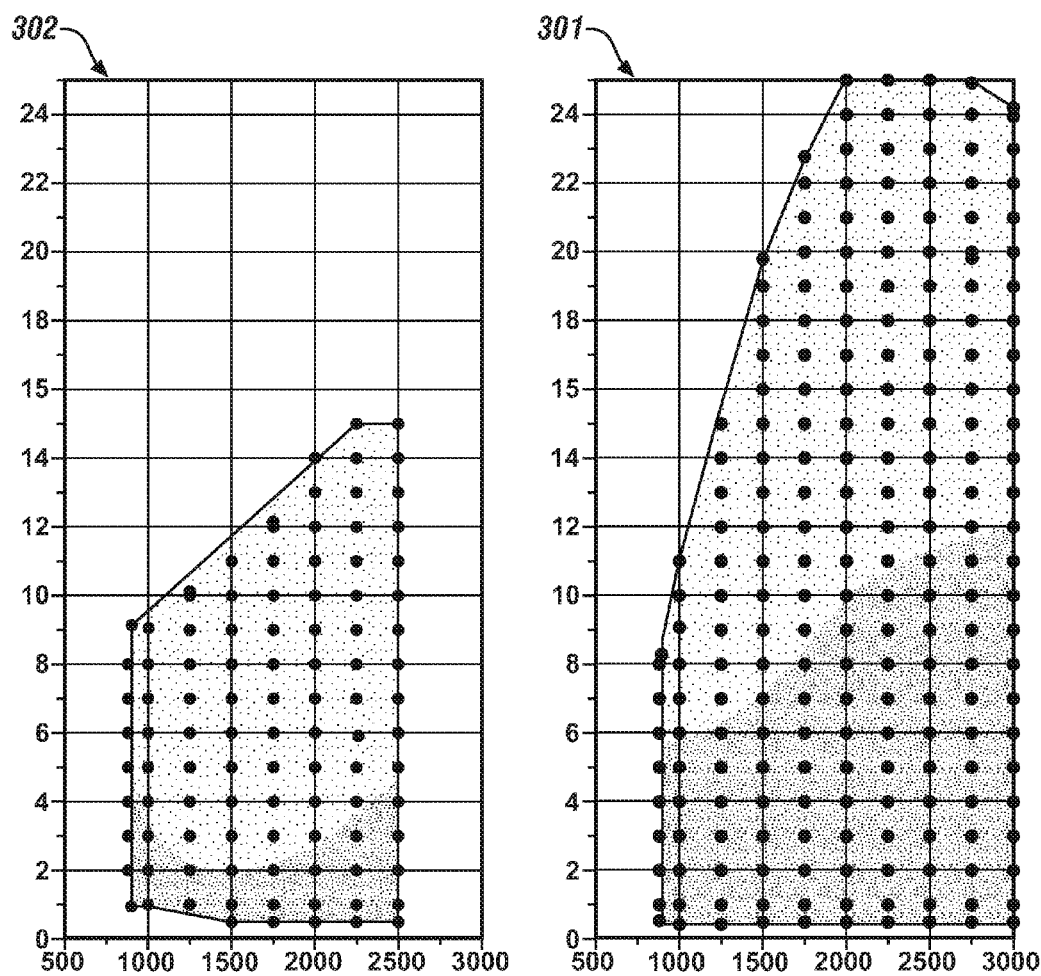
FIG. 3 illustrates exemplary plots of optimal lambda values for a diesel engine operating in exemplary first and second combustion modes, in accordance with the present disclosure.

FIG. 3 illustrates exemplary plots of optimal lambda values for a diesel engine operating in exemplary first and second combustion modes, in accordance with the present disclosure. The term "optimal lambda" can interchangeably be referred to as a "desired lambda." Plot 301 illustrates optimal lambda values at a plurality of speed-load points when the diesel engine is operating in the first combustion mode and plot 302 illustrates optimal lambda values at a plurality of speed-load points when the diesel engine is operating in the second combustion mode. In each of plots 301 and 302, the horizontal x-axis denotes engine speed (RPM) and the vertical y-axis denotes engine load (bar). As used herein, the term "engine load (bar)" is indicative of an engine torque output from the engine. In the illustrated example, each of plots 301 and 302 demonstrate that the lambda decreases, e.g., becomes richer, at higher loads and approaches a lambda value of 1.1 at maximum load. In an exemplary non-limiting embodiment, a lambda value of 1.1 can include the smoke limit for each of the first and second combustion modes in plots 301 and 302. The lambda value of the smoke limit is based on engine design and can include any value that is never less than 1.0. It will be understood that during transient operations, such as when an operator tips into an accelerator pedal requesting an immediate engine torque, and thus an increase in injected fuel mass, a time delay occurs in the air control to achieve the optimal lambda value based on the increased injected fuel mass. Thus, during transient operations, the torque required for acceptable drivability will push the shaping of an immediate torque faster than the air system will react. Accordingly, the actual lambda value during transient operations may fall lower than the optimal lambda value, undesirably effecting emissions and fuel economy. The lighter regions of plots 301 and 302 indicate more desirable optimal lambda values than the darker regions. For instance, optimal lambda values less than 2.0 are more desirable than optimal lambda values that are at least 2.0, wherein the lighter region of plots 301 and 302 are indicative of optimal lambda values less than 2.0 and the darker region of plots 301 and 302 are indicative of optimal lambda values at least 2.0. In some embodiments, the higher the optimal lambda value, the least desirable it is from an emissions and fuel efficiency standpoint.

Figure 4:
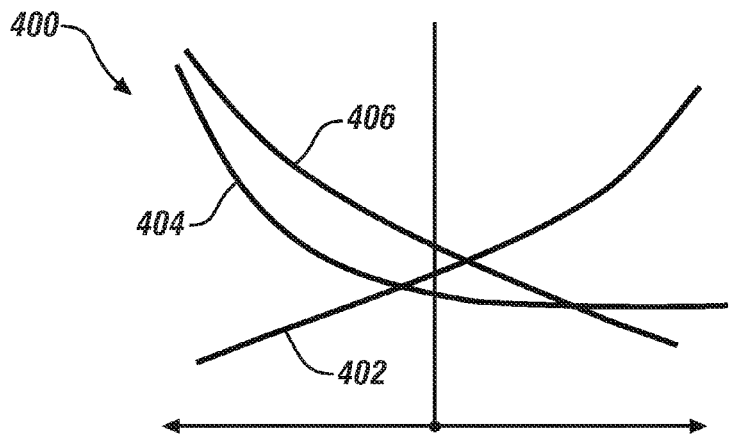
FIG. 4 illustrates a plot depicting tradeoffs when lambda values are increased and decreased from an optimal lambda value, in accordance with the present disclosure.

FIG. 4 illustrates a plot 400 depicting tradeoffs when lambda values are increased and decreased from an optimal lambda value, in accordance with the present disclosure. In general, decreasing an injected fuel mass from the optimal lambda value results in increased NOx emissions, e.g., decreased emissions efficiency, and increasing the injected fuel mass from the optimal lambda value results in increased fuel consumption, e.g., decreased fuel efficiency, and particulates. The horizontal x-axis includes the optimal lambda value at the point of orgin, wherein lambda values increase (e.g., become leaner) from the optimal lambda value to the right of the point of origin and lambda values decrease (e.g., become richer) from the optimal lambda value to the left of the point of origin. It will be appreciated when lambda increases, less torque capability is provided by the diesel engine; and when lambda decreases, more torque capability is provided by the diesel engine. The vertical y-axis generally denotes a respective magnitude for values of particulates, fuel economy and NOx emissions. A NOx emissions profile 402 gradually increases as lambda increases. A particulate profile 406 and a $CO_2$ profile 404 gradually decrease as lambda increases. The $CO_2$ profile 404 can be indicative of fuel economy. Thus, as lambda increases, NOx emissions increase, fuel economy increases, and torque capability decreases. Similarly, as lambda decreases, NOx emissions decrease, fuel economy decreases, and torque capability increases. Thus, particulates and CO2 increase, and thus, become less desirable as lambda decreases. It will be appreciated that diesel engines must be optimized such that decreasing the impact of emissions often takes priority before decreasing the impact of fuel consumption. Gasoline engines, on the other hand, produce lower magnitudes of harmful emissions, e.g., NOx and hydrocarbons, than that of diesel engines, and thus, gasoline engines are generally optimized to decrease the impact of fuel consumption.

During steady state conditions, it is important that the diesel engine be optimized to consider the emissions impact on set engine operating points and not just the fuel consumption impact on the set engine operating points. During transient operations, e.g., an operator tip-in requesting an immediate engine torque, it is essential that the diesel engine be optimized such that the injected fuel mass for achieving the immediate engine torque be controlled to the optimal lambda value if possible.

Figure 5:
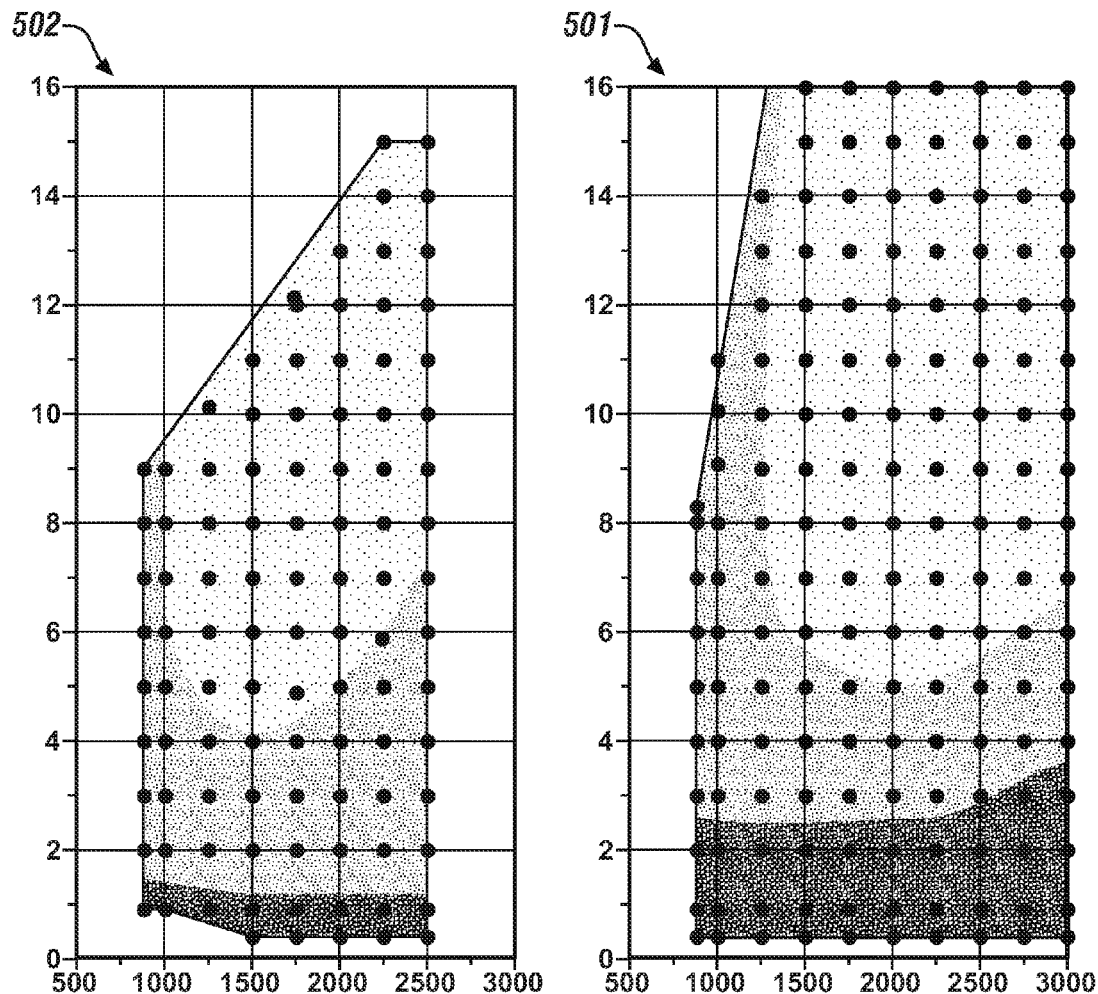
FIG. 5 illustrates exemplary plots of Brake Specific Fuel Consumption values for a diesel engine operating in exemplary first and second combustion modes, in accordance with the present disclosure.

FIG. 5 illustrates exemplary plots of Brake Specific Fuel Consumption (BSFC) values for a diesel engine operating in exemplary first and second combustion modes, in accordance with the present disclosure. As used herein, the term BSFC value is an amount of fuel consumed and can be referred to as a "fuel loss." Plot 501 illustrates BSFC values, e.g. fuel losses, at a plurality of speed-load points when the diesel engine is operating in the first combustion mode and plot 502 illustrates BSFC, e.g., fuel losses, values at a plurality of speed-load points when the diesel engine is operating the second combustion mode. In each of plots 501 and 502, the horizontal x-axis denotes engine speed (RPM) and the vertical y-axis denotes engine load (bar). As used herein, the term "engine load (bar)" is indicative of an engine torque output from the engine. In the illustrated example, lower BSFC values are indicative of better fuel efficiency, e.g., lower fuel losses, and higher BSFC values are indicative of worse fuel efficiency, e.g. higher fuel losses. As illustrated, the diesel engine has large regions (e.g., lightest shading) of optimal fuel efficiency, e.g., BSFC values less than 240. It will be appreciated, that regions having darker shading have worse fuel efficiency, e.g., higher BSFC values. For instance, the darkest shaded region includes BSFC values greater than 300 and approaching 900 at the lowest loads. The second darkest shaded region includes BSFC values between 240 and 300. Referring to the speed-load point at 1,750 RPM at 6 bar in each of plots 501 and 502, the first combustion mode of plot 501 has a BSFC value of 225 and the second combustion mode of plot 502 has a BSFC value of 230. Hence, the fuel loss tradeoff between the first and second combustion modes only favors the first combustion mode by roughly 2.00%. As will become apparent with reference to FIG. 6 below, the second combustion mode has far better emissions efficiency than that of the first combustion mode.

Figure 6:
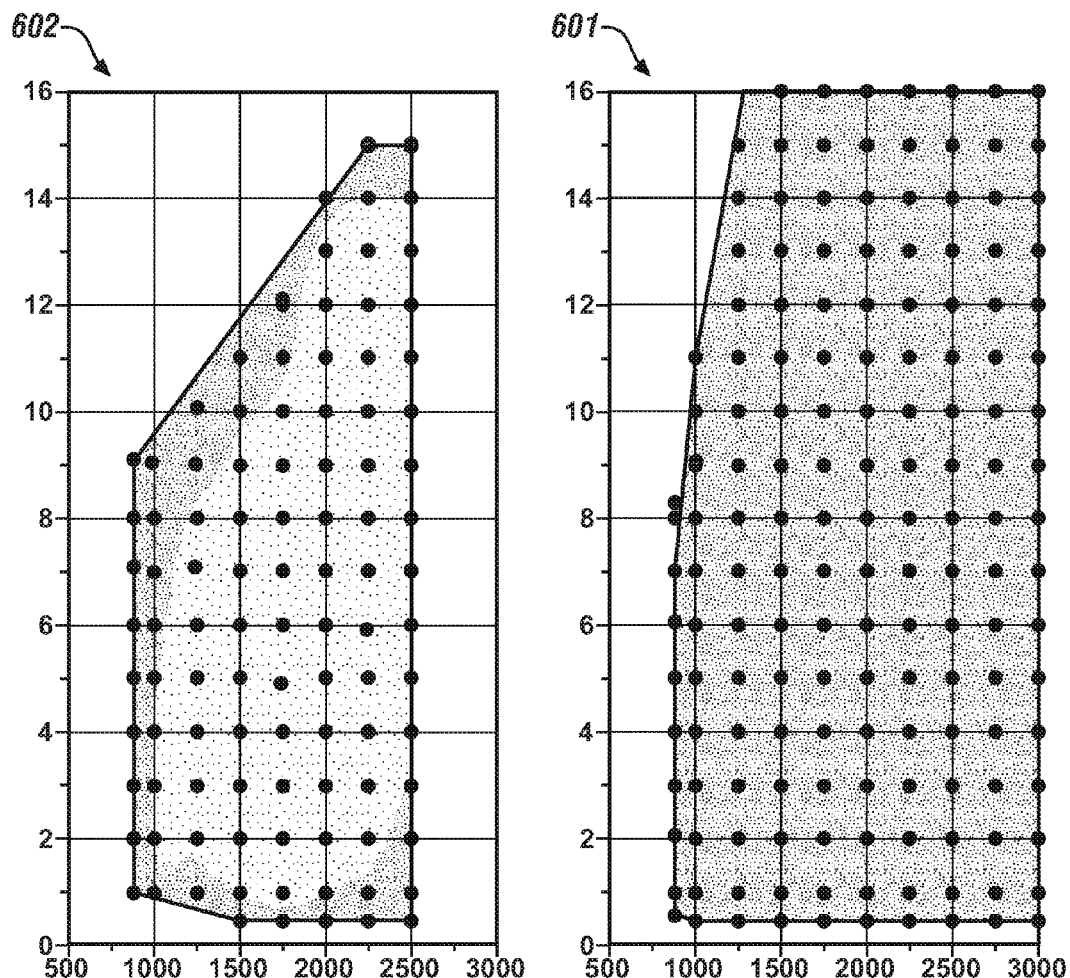
FIG. 6 illustrates exemplary plots of NOx emission values after combustion for the diesel engine operating in the exemplary first and second combustion modes of FIG. 5, in accordance with the present disclosure.

FIG. 6 illustrates exemplary plots of NOx emission values after combustion for the diesel engine operating in the exemplary first and second combustion modes of FIG. 5, in accordance with the present disclosure. As used herein, the term "NOx emission value" can refer to an "emissions loss." Plot 601 illustrates NOx emission values, e.g. emissions losses, at a plurality of speed-load points when the diesel engine is operating in the first combustion mode and plot 602 illustrates NOx emission values, e.g. emissions losses, at a plurality of speed-load points when the diesel engine is operating in the second combustion mode. In each of plots 601 and 602, the horizontal x-axis denotes engine speed (RPM) and the vertical y-axis denotes engine load (bar). As used herein, the term "engine load (bar)" is indicative of an engine torque output from the engine. In the illustrated example, lower NOx emission values are indicative of better NOx emissions efficiency and higher NOx emissions values are indicative of worse NOx emissions efficiency. As illustrated, the diesel engine has larger regions (e.g., lighter shading) of optimal NOx emissions efficiency, e.g., NOx emission values less than 2.00, in the second combustion mode of plot 602 than that of the first combustion mode of plot 601. In the non-limiting illustrated embodiment, the first combustion mode of plot 601 contains no optimal values of NOx emissions efficiency, wherein each NOx emissions efficiency value is at least 5.0. Referring to the speed-load point at 1,750 RPM and 6 bar, the first combustion mode of plot 601 has a NOx emission value of 6.5 and the second combustion mode of plot 602 has a NOx emission value of 0.4. Hence, the NOx emissions loss tradeoff between the first and second combustion modes favors the second combustion mode by roughly 1,625%. Accordingly, for a 2.00% loss in fuel efficiency, the NOx emissions efficiency can be improved by 1,625% when utilizing the second combustion mode instead of the first combustion mode at the speed-load point at 1,750 RPM and 6 bar. In one embodiment, the speed-load point at 1,750 RPM and 6 bar would be selected as a desired engine operating point and the second combustion mode would be selected for operating the diesel engine. As will be discussed in greater detail below, the hybrid powertrain 100 of FIG. 1 can utilize the transmission 20 and/or one or more of the torque machines 40 to influence the desired engine operating point so operation of the diesel engine can be performed in the combustion mode when available.

Figure 7:
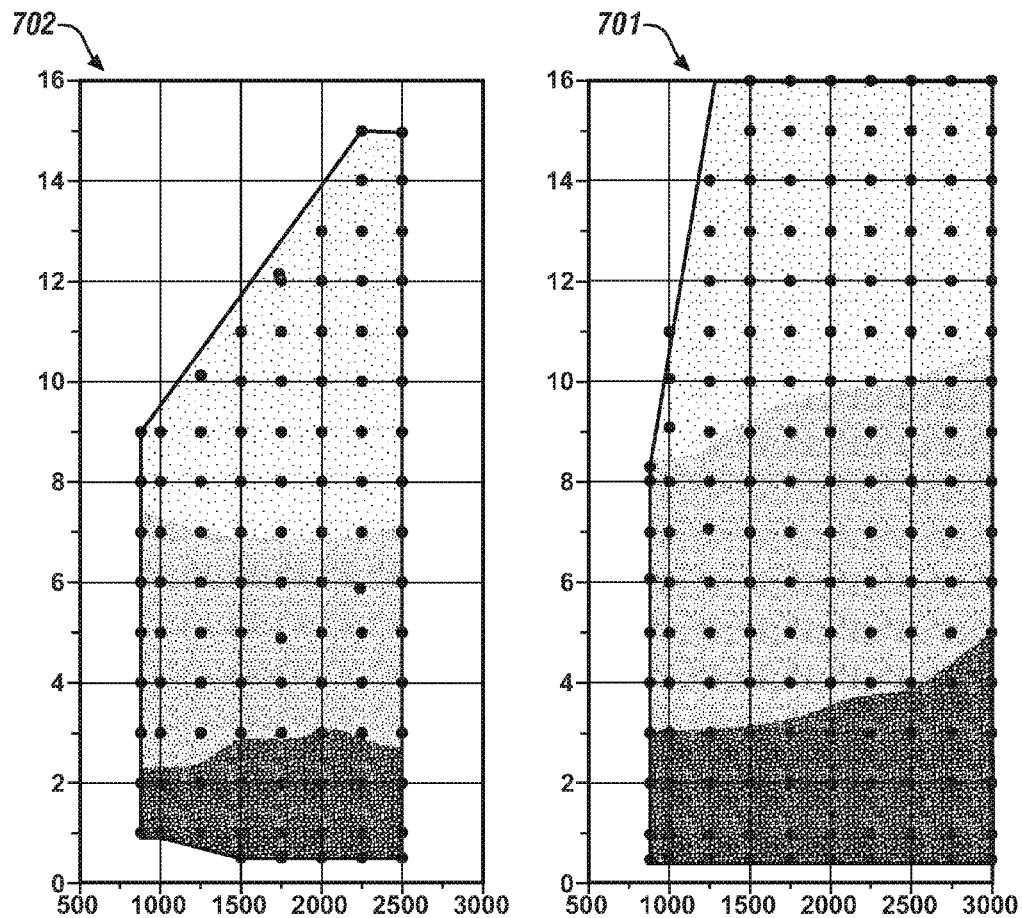
FIG. 7 illustrates exemplary plots of hydrocarbon (HC) emission values after combustion for the diesel engine operating in the exemplary first and second combustion modes of FIGS. 5 and 6, in accordance with the present disclosure.

FIG. 7 illustrates exemplary plots of hydrocarbon (HC) emission values after combustion for the diesel engine operating in the exemplary first and second combustion modes of FIGS. 5 and 6, in accordance with the present disclosure. As used herein, the term "HC emission value" can refer to an "emissions loss." Plot 701 illustrates HC emission values, e.g. emissions losses, at a plurality of speed-load points when the diesel engine is operating in the first combustion mode and plot 702 illustrates HC emission values, e.g. emissions losses, at a plurality of speed-load points when the diesel engine is operating in the second combustion mode. In each of plots 701 and 702, the horizontal x-axis denotes engine speed (RPM) and the vertical y-axis denotes engine load (bar). As used herein, the term "engine load (bar)" is indicative of an engine torque output from the engine. In the illustrated example, lower HC emission values are indicative of better HC emissions efficiency and higher HC emissions values are indicative of worse HC emissions efficiency. As illustrated, there is not as large of a tradeoff for HC emissions efficiency values between the first and second combustion modes of plots 701 and 702 as there was for the NOx emissions efficiency values as described in the non-limiting embodiment of FIG. 6. Accordingly, fuel efficiency and NOx emissions efficiency are the largest influences for optimizing the diesel engine versus utilization of the one or more torque machines 40 under steady-state conditions. In the illustrated non-limiting embodiment, darker regions are indicative of worse HC emissions efficiency than lighter regions. For instance, the darkest region corresponds to HC emissions efficiency values at least 1.4, the second darkest region corresponds to HC emissions efficiency values ranging from 0.4 to 1.4, and the lightest region corresponds to HC emissions efficiency values less than 0.4.

Figure 8:
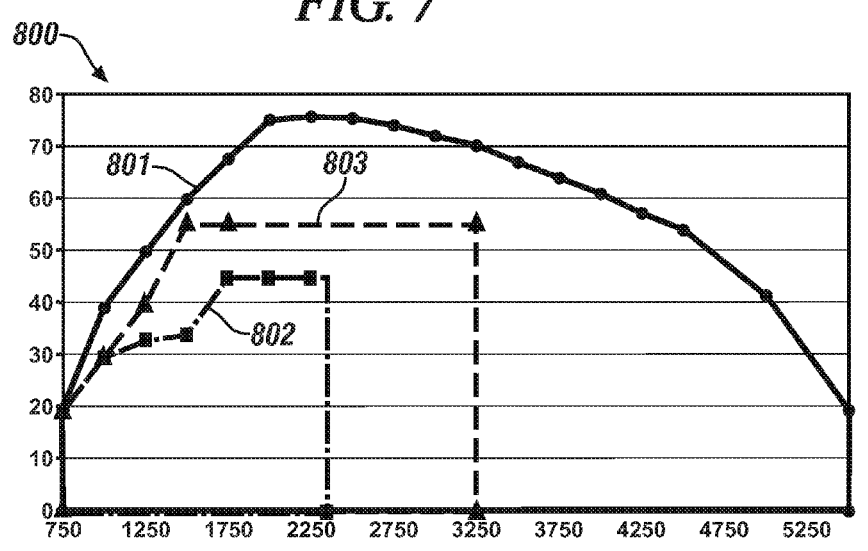
FIG. 8 illustrates a plot of exemplary first, second and third diesel combustion modes, in accordance with the present disclosure.

FIG. 8 illustrates a plot 800 of exemplary first, second and third combustion modes of a diesel engine, in accordance with the present disclosure. The horizontal x-axis denotes engine speed (RPM) and the vertical y-axis denotes a fuel request ($mm^3$). It will be appreciated that while the fuel request is described in units of volume in plot 800, the fuel request can be correlated to an injected fuel mass (mg) when density of the fuel being injected is known. In diesel engines, a magnitude of the requested fuel directly corresponds to the torque/load at that point. Accordingly, intake air mass is adjusted to achieve the optimal lambda based on the fuel request. The optimal lambda, e.g., desired lambda, described with reference to the non-limiting embodiment of FIG. 3, is based on a desired balance of emissions efficiency, fuel efficiency, noise, vibrations and harshness. Adjusting the intake air mass to achieve the desired air-fuel ratio can include adjusting at least one of exhaust gas recirculation entering the diesel engine, intake air pressure, and throttle opening to achieve the optimal lambda at a desired operating point based on the fuel request.

The first combustion mode 801 encompasses the entire speed range of plot 800 from 750 RPM to 5,500 RPM. The second combustion mode 802 only includes a speed range from 750 RPM to about 2,300 RPM. The third combustion mode 803 includes a speed range from 750 RPM to 3,250 RPM. In the illustrated embodiment, the first combustion mode 801 corresponds to the first combustion mode and the second combustion mode 802 corresponds to the second combustion mode described with reference to the non-limiting embodiments of FIGS. 5-7.

The first combustion mode 801 is desirable during extreme environmental conditions and during high engine speeds and high torque loads. The first combustion mode 801 is also selected as a default during fault conditions within the diesel engine that may render the second and third combustion modes 802, 803, respectively, as unavailable. Generally, the first combustion mode 801 has the best performance during vehicle launch conditions, due to the first diesel combustion mode 801 having the highest smoke limit.

The second combustion mode 802 includes the lowest load/torque range corresponding to a maximum fuel request of 45 $mm^3$ at engine speeds between 1,750 RPM to 2,300 RPM. Generally, the second combustion mode includes a decreased engine torque and speed range, decreased emissions losses, increased fuel losses and decreased drivability from operation in the first combustion mode 801. Depending upon a selected speed-load point, the second combustion mode 802 includes slightly degraded fuel efficiency, e.g., greater fuel loss, than the first and third combustion modes 801, 803, respectively. As aforementioned, and in contrast to gasoline engines, diesel engines must be optimized such that decreasing the impact of emissions takes priority before decreasing the impact of fuel consumption. Thus, it is generally desirable to select diesel engine operation in the second diesel combustion mode 802 if the second diesel combustion mode is available.

In the second combustion mode 802, combustion is controlled according to a desired burned fuel mass fraction, measurable according to crank angle. In an exemplary embodiment, the desired burned fuel mass fraction is 50%. Controlling combustion according to the desired burned fuel mass fraction requires large magnitudes of exhaust gas recirculation (EGR) rendering spark assist ineffective for controlling combustion. The desired burned fuel mass fraction is determined by monitoring in-cylinder pressure utilizing an in-cylinder pressure sensor. In an exemplary embodiment, the second combustion mode 802 can be deemed unavailable when a fault condition including an in-cylinder pressure fault is detected. The fault in the in-cylinder pressure can include detection of a failed in-cylinder pressure is detected. Furthermore, the second combustion mode 802 requires in-cylinder temperatures to be at least a threshold temperature necessary for achieving a desired magnitude of EGR for operation in the second combustion mode 802. In an exemplary embodiment, the fault condition can include faults in air control to the engine being detected. For instance, a fault in the air control can be detected when a monitored in-cylinder temperature being less than the threshold temperature, and thus, rendering the second combustion mode 802 unavailable. Furthermore, environmental conditions that are not conducive for operation in the second combustion mode can include detection of the fault condition deeming the second combustion mode unavailable. For instance, engine cold starts and vehicle launching conditions can include environmental conditions deeming the second combustion mode unavailable.

The third combustion mode 803 includes an intermediate load torque range corresponding to a maximum fuel request of 45 $mm^3$ at engine speeds between 1,500 RPM to 3,250 RPM. The third combustion mode 803 includes emissions losses decreased from operation in the first combustion mode 801 and increased from operation in the second combustion mode 802. The third combustion mode 803 includes fuel losses increased from operation in the first combustion mode 801 and decreased from operation in the second combustion mode 802. Furthermore, drivability is decreased from operation in the first combustion mode 801 but increased from operation in the second combustion mode 802. Hence, the third combustion mode 803 has a higher smoke limit than that of the second combustion mode 802.

It will be appreciated that the second and third combustion modes 802, 803, respectively, will not be deemed unavailable if a speed-load point necessary for achieving a desired axle torque is not within the respective speed-load range of second combustion mode 802 or the respective speed-load range of the third combustion mode 803. For instance, a non-achieving engine operating point can be selected that is within the second combustion mode 802 to obtain the lower emissions losses associated with operation in the second combustion mode 802, wherein the non-achieving engine operating point does not achieve the desired axle torque but is utilized to achieve the desired axle torque. In one embodiment, a respective motor torque from the one or more electric machines 40 of FIG. 1 can be assigned to achieve the desired axle torque when combined with the non-achieving engine operating point of the second combustion mode. It will be understood that a state of charge (SOC) of the ESD of the high-voltage electrical power system 80 of FIG. 1 must be greater than a SOC threshold so that the respective motor torque can be assigned. Additionally or alternatively, when the transmission device 20 of FIG. 1 includes an automatic transmission, a gear ratio state of the transmission device 20 of FIG. 1 can be changed such that the desired axle torque is achieved when multiplied by the changed gear ratio state of the transmission device 20.

Exemplary embodiments are directed toward selecting a desired engine operating point within one of the available combustion modes, wherein the desired engine operating point corresponds to one of a plurality of potential operating points having a lowest power loss. As used herein, the term "potential operating point" refers to a speed-torque point within the engine speed and torque ranges of one of the available combustion modes that is utilized to achieve the desired axle torque. As used herein, the term "utilized to achieve" can refer to the potential engine operating point achieving the desired axle torque solely with torque provided by the engine or the potential engine operating point can correspond to a non-achieving engine operating point where a combination of engine torque and an assigned motor torque achieve the desired axle torque. Accordingly, a respective fuel loss and a respective emissions loss at each potential operating point may be summed together to determine a respective power loss. One or more of the potential engine operating points may be within one of the combustion modes, while the other potential engine operating points may be within one or more of the other combustion modes. Furthermore, one or more of the potential engine operating points may achieve the desired axle torque, whereas the other potential engine operating points may include a respective motor torque to achieve the desired axle torque when combined with the respective potential engine operating point that does not achieve the desired axle torque. Accordingly, the respective power loss can be further based upon a respective energy loss, wherein the respective energy loss is based on electrical power required to supply the one or more torque machines applying the respective motor torque. The respective energy loss can be obtained by determining the torque capacity of the one or more torque machines 40. Additionally, when the transmission includes an automatic transmission, each potential engine operating point corresponds to respective ones of a plurality of gear ratios of the transmission device, wherein each potential engine operating point is utilized to achieve the desired axle torque when multiplied by one of the plurality of gear ratios of the transmission device. Accordingly, the respective power loss may further be based on a respective transmission spin loss, wherein the respective transmission spin loss corresponds to a selected one of the plurality of gear ratios of the transmission device utilized to achieve the desired axle torque.

Figure 9:
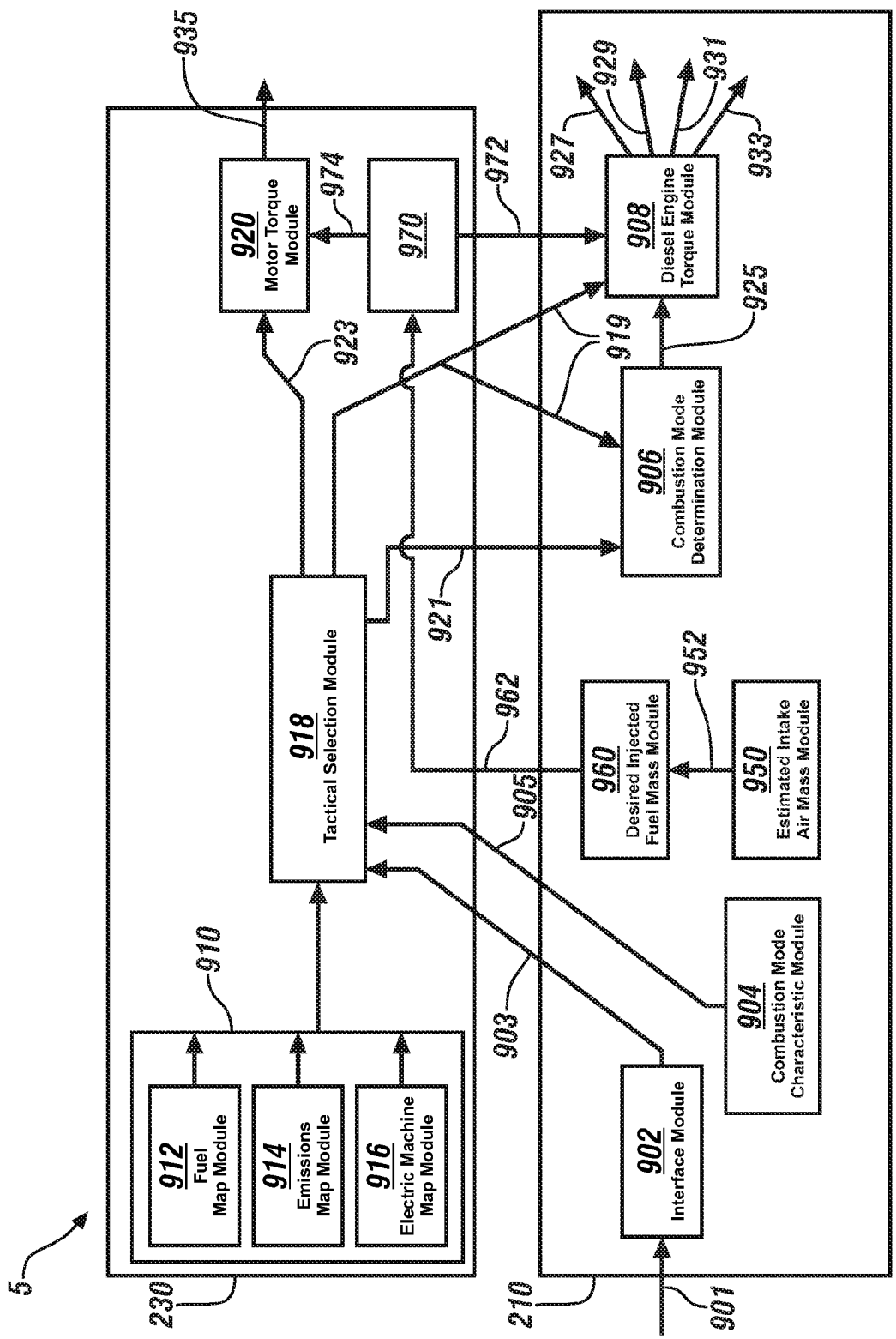
FIG. 9 illustrates the controller of FIG. 1 including communication between an engine control module and a supervisory hybrid control module for selecting a desired engine operating point during steady state conditions and determining an immediate torque request during transient conditions, in accordance with the present disclosure.

FIG. 9 illustrates the controller 5 of FIG. 1 including communication between an engine control module and a supervisory hybrid control module for selecting a desired engine operating point during steady state conditions and determining an immediate torque request during transient conditions, in accordance with the present disclosure. The ECM 210 includes an interface module 902, a combustion mode characteristic module 904, a combustion mode determination module 906, and a diesel engine torque module 908. The HCP 230 includes a map module 910, a tactical selection module 918, and a motor torque module 920.

The interface module 902 of the ECM 210 receives an output torque request 901. The output torque request 901 can be in response to a user input to the user interface 13 of FIG. 1. The interface module 902 determines a desired axle torque 903 based on the output torque request 901. The tactical selection module 918 monitors the desired axle torque 903.

The combustion mode availability module 904 determines availability for each of a plurality of combustion modes. In an exemplary embodiment, the plurality of combustion modes include the first, second and third combustion modes described with reference to the exemplary plot 800 of FIG. 8. For instance, the first combustion mode is always available and the second and third combustion modes are available unless a control or fault condition is detected that deems either one of the second and third combustion modes unavailable. The combustion mode availability module 904 further determines, for each available combustion mode, an engine torque range from a minimum engine torque to a maximum engine torque and an engine speed range from a minimum engine speed to a maximum engine speed. Accordingly, an available combustion mode output 905 is received by the tactical selection module 918. The available combustion mode output 905 includes each available combustion mode and the engine torque and speed ranges for each available combustion mode.

The map module 910 includes a fuel map module 912, an emissions map module 914, and an electric machine map module 916. The fuel map module 912 stores a plurality of fuel losses, e.g., BSFC values, at a plurality of speed-load points for each combustion mode. For instance, the fuel map module 912 stores the BSFC values for operating the diesel engine in each combustion mode as described with reference to the exemplary plots 501 and 502 illustrated in FIG. 5. The emissions map module 914 stores a plurality of emissions losses, e.g., NOx emissions values and/or HC emissions values, at a plurality of speed-load points for each combustion mode. For instance, the emissions map module 914 stores the NOx emissions values for operating the diesel engine in each combustion mode as described with reference to the exemplary plots 601 and 602 illustrated in FIG. 6. Additionally or alternatively, the emissions map module 914 stores, for each combustion mode, the HC emissions values for operating the diesel engine as described with reference to the exemplary plots 701 and 701 illustrated in FIG. 7. The electric machine map module 916 stores energy losses based on torque capacity for operating the one or more torque machines 40, e.g., electric machines, providing motor torque.

Based upon the available combustion mode output 905 including each available combustion mode and the engine torque and speed ranges for each available combustion mode, the tactical selection module 918 retrieves, for each available combustion mode, the plurality of fuel losses from the fuel map module 912 and the plurality of emissions losses from the emissions map module 914. Each fuel loss corresponds to respective ones of a plurality of engine operating points within the engine torque and speed ranges of the available combustion modes. Each emissions loss corresponds to respective ones of the plurality of engine operating points within the engine torque and speed ranges of the available combustion modes. In scenarios when a motor torque is assigned to assist in achieving the desired axle torque or when a motor torque is assigned to assist in achieving a transient desired axle torque such that a desired air-fuel ratio of the engine can be maintained, the tactical selection module retrieves the energy losses from the electric machine map module 916.

The tactical selection control module 918 compares the respective fuel and emissions losses at each of a plurality of potential engine operating points within the engine torque and speed ranges of the available combustion modes. As aforementioned, each potential operating point corresponds to an engine operating point utilized to achieve the desired axle torque 903. The comparing includes summing the respective fuel and emissions losses and determining a respective power loss based on the summing at each potential engine operating point. In some embodiments, the respective power loss may further be based upon a respective energy loss at each of the plurality of potential engine operating points based on electrical power required to supply the one or more torque machines. For instance, for potential engine operating points achieving the desired axle torque solely with engine torque provided by the engine, each respective energy loss would be zero. However, for potential engine operating points that correspond to non-achieving engine operating points, each respective energy loss would include a non-zero integer corresponding to the energy loss resulting from the electrical power required to supply the one or more torque machines outputting each respective assigned motor torque. Additional embodiments can include the respective power loss further based upon a respective transmission spin loss based on a selected gear ratio of the transmission at each of the plurality of potential engine operating points.

Exemplary embodiments are directed toward the tactical selection control module 918 performing at least one optimization to select a desired engine operating point 919 within one of the available combustion modes. The desired engine operating point 919 corresponds to one of the potential engine operating points having a lowest power loss based on the compared respective fuel and emissions losses. The at least one optimization can include a fast optimization based solely upon a presently selected gear ratio of the transmission. The fast optimization can be performed when the transmission includes either one of a hybrid transmission, an automatic transmission and a manual transmission. The fast optimization analyzes the respective power loss at each potential engine operating point and selects the desired engine operating point as the potential engine operating within one of the available combustion modes point having the lowest power loss. The at least one optimization can further include a slow optimization based on several combinations of different gear ratios of the transmission. The slow optimization can only be performed when the transmission includes either one of the hybrid transmission and the automatic transmission. The slow optimization analyzes the respective power loss at each potential engine operating point at each of the different gear ratios of the transmission and selects the desired engine operating point as the potential engine operating point within one of the available combustion modes at one of the gear ratios of the transmission having the lowest power loss.

In an exemplary embodiment, the desired engine operating point corresponds to a desired engine torque at an engine speed utilized to achieve the desired axle torque. Accordingly, the tactical selection module 918 outputs the desired engine operating point 919 to each of the combustion mode determination module 906 and the diesel engine torque module 908 of the ECM 210. The tactical selection module 918 further outputs a selected combustion mode 921 corresponding to the available combustion mode 921 of the desired engine operating point 919 to the combustion mode determination module 906. Additionally, when the desired engine operating point 919 includes a non-achieving engine operating point, i.e., the desired engine operating point does not achieve the desired axle torque solely with engine torque, the tactical selection module 918 outputs an assigned motor torque 923 to the motor torque module 920. It will be appreciated that a sum of the desired engine operating point 919 and the assigned motor torque 923 achieve the desired axle torque 903.

The combustion mode determination module 906 receives the selected combustion mode 921 and the desired engine operating point 919 and outputs a commanded selected combustion mode 925 to the diesel engine torque module 908. Based upon the desired engine operating point 919, the diesel engine torque module 908 determines an injected fuel mass 927 to achieve the desired engine operating point. The diesel engine torque module 908 further adjusts intake air mass to achieve a desired air-fuel ratio at the desired engine operating point based on the determined injected fuel mass. For instance, the desired air-fuel ratio, e.g., desired lambda, can be obtained from the plots of desired lambda/optimal lambda values using the desired engine operating point described with reference to the exemplary embodiment of FIG. 3. The engine torque module 908 adjusts the intake air mass by adjusting at least one of exhaust gas recirculation 929 entering the diesel engine, intake air pressure 931 and throttle opening 933 to achieve the desired air-fuel ratio at the desired engine operating point within the one of the available combustion modes based on the determined injected fuel mass 927. Intake air pressure can be adjusted through turbo charging and/or supercharging.

The motor torque module 920 outputs a commanded assigned motor torque 935 to the one or more torque machines (40) for providing the assigned motor torque 923.

Figure 10:
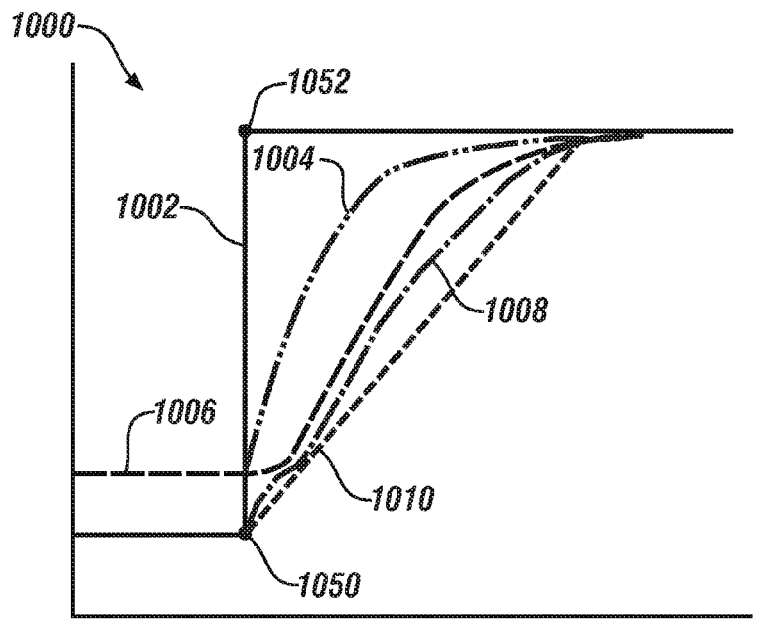
FIG. 10 illustrates a non-limiting example of a plot during an operator tip-in requesting immediate engine torque and optimizing the diesel engine such that the injected fuel mass for achieving the immediate engine torque be controlled at a desired air-fuel ratio, in accordance with the present disclosure.

FIG. 9 illustrates selection of the desired engine operating point during steady during steady state conditions, such that the desired engine operating point corresponds to a set point for the diesel engine obtaining the lowest power losses during operation. However, it is additionally desirable that a desired air-fuel ratio be maintained during transient operating conditions such that a desired balance between emissions efficiency, fuel efficiency, noise, vibrations and harshness is achieved. FIG. 10 illustrates a non-limiting plot 1000 during an operator tip-in requesting immediate engine torque and optimizing the diesel engine such that the injected fuel mass for achieving the immediate engine torque be controlled at a desired air-fuel ratio, in accordance with the present disclosure. The horizontal x-axis denotes time (sec) and the vertical y-axis denotes injected fuel mass (mg). It will be appreciated that the injected fuel mass corresponds to an engine torque. The plot includes a desired axle torque request 1002, a torque shaping profile 1004, a smoke limit profile 1006, an injected fuel mass profile 1008 and a desired injected fuel mass profile 1010 for maintaining the desired air-fuel ratio. Accordingly, the desired injected fuel mass profile 1010 corresponds to an injected fuel mass utilized to maintain the desired instantaneous air-fuel ratio.

At point 1050, a transient operator torque request exceeding a transient threshold occurs. It will be appreciated that the diesel engine is operating under steady state conditions at a desired engine operating point up until point 1050. The desired axle torque request 1002 increases in response to the transient operator torque request to point 1052, wherein a desired transient axle torque based on vehicle speed and the transient operator torque request is determined. The torque shaping profile 1004 illustrates a desired path that axle torque should be increased to achieve the desired transient axle torque while maintaining acceptable drivability. The torque shaping profile 1004 can be predetermined and based on system constraints of a powertrain of the vehicle. The smoke limit profile 1006 indicates an injected fuel mass corresponding to an air-fuel ratio (e.g., lambda) value, wherein injected fuel masses above the smoke limit profile 1006 violate a smoke limit by producing smoke when combusted. However, it is appreciated that the closer the injected fuel mass is to the smoke limit, the better the drivability is for achieving the desired transient axle torque. The desired injected fuel mass profile 1010, corresponding to the desired instantaneous air-fuel ratio, indicates a desired injected fuel mass necessary for maintaining the desired air-fuel ratio for achieving a desired balance between emissions efficiency, fuel efficiency, noise, vibrations and harmonics. When the injected fuel mass is increased, the intake air mass must be adjusted such that the desired air-fuel ratio be maintained. However, adjusting the intake air mass in accordance with increases in the injected fuel mass to achieve the desired air-fuel ratio results in a time delay. Accordingly, increasing the injected fuel mass in accordance with the torque shaping profile 1004 would result in an actual air-fuel ratio falling lower than the desired air-fuel ratio due to the time delay associated with adjusting the intake air mass.

Embodiments herein are further directed toward optimizing the diesel engine such that the injected fuel mass for achieving the desired transient axle torque be controlled to the desired air-fuel ratio, as opposed to being controlled to the torque shaping profile 1004. Specifically, the diesel engine is optimized to place a first priority on the shaping profile and a second priority on the desired injected fuel mass profile 1010, wherein the injected fuel mass profile 1008 is controlled closely to the desired injected fuel mass profile 1010 to eventually achieve the torque shaping profile 1004 at around the desired transient axle torque. While the injected fuel mass profile 1008 is always below the smoke limit profile 1006, and thus does not violate the smoke limit, acceptable drivability is not achieved as indicated by the offset between the injected fuel mass profile 1008 and the torque shaping profile 1004. In this instance, a motor torque provided by the one or more torque machines 40 can be assigned to compensate for the difference, e.g., offset, between the injected fuel mass profile 1008 and the torque shaping profile 1004, such that acceptable drivability can be obtained without violating the smoke limit.

Referring back to FIG. 9, when transients in the desired engine operating point 919 are determined, it is desirable to optimize the diesel engine such that an injected fuel mass for achieving the desired transient engine operating point be controlled to a desired air-fuel ratio such that an actual air-fuel ratio does not fall below the desired air-fuel ratio as a result of a time delay associated with adjusting the intake air mass. In one embodiment, transients in the desired engine operating point 919 can be determined during operator tip-in conditions when the desired axle torque 903 includes a desired transient axle torque based on a transient operator torque request exceeding a transient threshold. In another embodiment, transients in the desired engine operating point 919 can be determined when the desired engine operating point 919 is a non-achieving engine operating point and motor torque is being utilized to achieve the desired axle torque, wherein a state of charge of the high-voltage electrical system 80 becomes insufficient for providing the motor torque utilized to achieve the desired axle torque. Accordingly, the desired engine operating point must be adjusted to achieve the desired axle torque to compensate for motor torque that may no longer be available. Thus, in the latter embodiment, the desired axle torque remains steady even though the desired engine operating point is in transient. Controlling the injected fuel mass to achieve the desired air-fuel ratio requires an instantaneous intake air mass entering the diesel engine to be estimated. As used herein, the term "instantaneous intake air mass" refers to a presently occurring intake air mass entering the diesel engine. An estimated intake air mass module 950 outputs an estimated instantaneous intake air mass 952 to a desired injected fuel mass module 960.

The desired injected fuel mass module 960 monitors a desired instantaneous air-fuel ratio corresponding to the desired transient engine operating point. The desired injected fuel mass module 960 determines a desired instantaneous injected fuel mass to achieve the desired instantaneous air-fuel ratio based on the estimated instantaneous intake air mass 952. The desired injected fuel mass module 960 translates the desired instantaneous injected fuel mass to a desired torque request 962 that is transmitted to a tactical execution module 970 of the HCP 230.

The tactical execution module 970 outputs an immediate torque request 972 to the diesel engine torque module 908. The immediate torque request 972 is based on the desired torque request 962 and motor torque capacity. It is desirable that the immediate torque request 972 correspond to the desired torque request such that motor torque can be applied to meet the desired axle torque. However, conditions can occur where motor torque capacity is insufficient for applying required motor torque for meeting the desired axle torque. Under these conditions, the immediate torque request 972 can be controlled away from the desired torque request as needed so that the desired axle torque can be met. Thereafter, the diesel engine torque module 908 translates the received immediate torque request 972 into an injected fuel mass 927. When the immediate torque request 972 is less than a torque shaping profile for achieving the desired axle torque 903, e.g., acceptable drivability is not achieved, the tactical execution module 970 outputs an immediate motor torque 974 to the motor torque module 920 to compensate for the difference between the immediate torque request 972 and the torque shaping profile such that acceptable drivability is achieved.

Based upon immediate torque request 972, the diesel engine torque module 908 determines the injected fuel mass 927 to achieve the desired axle torque while maintaining the desired air-fuel ratio. As aforementioned, the diesel engine torque module 908 adjusts intake air mass through air flow actuators such as the exhaust gas recirculation 929, intake air pressure 931, and throttle opening 933 to achieve an intake air mass (and content of airflow such as exhaust residuals from exhaust gas recirculation) to enable the engine to operate in steady state at the desired operating point 919 with optimal emissions efficiency. Based on the intake air mass at the desired operating point 919, if the immediate torque request 972 is controlled to the selected combustion mode 921, the injected fuel mass should achieve both the torque at the desired operating point 919 in steady state and the optimal emissions efficiency in both steady state and transient operations. Controlling the injected fuel mass 927 based upon the immediate torque request 972 allows for the desired air-fuel ratio to always be maintained when the instantaneous intake air mass is estimated, wherein any drivability sacrificed can be compensated for by the immediate motor torque 974.

The motor torque module 920 outputs a commanded assigned motor torque 935 to the one or more torque machines (40) for providing the immediate motor torque 974.

Figure 11:
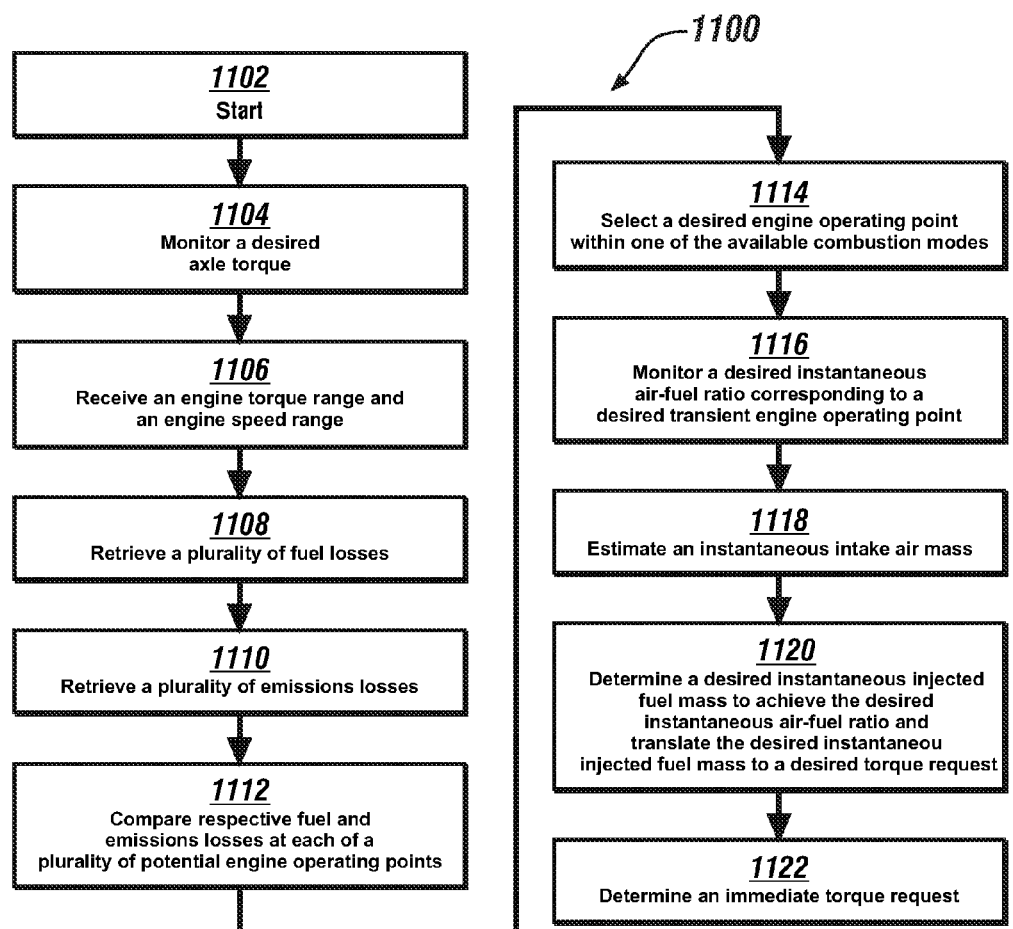
FIG. 11 illustrates a flowchart selecting a desired engine operating point during steady state conditions and determining an immediate torque request during transient conditions, in accordance with the present disclosure.

FIG. 11 illustrates a flowchart 1100 for selecting a desired engine operating point during steady state conditions and determining an immediate torque request during transient conditions, in accordance with the present disclosure. The flowchart 1100 may be implemented within the controller 5 of FIG. 1 that includes the engine control module (ECM 210) and the supervisory hybrid control module (HCP 230) of FIG. 9.

Table 1 is provided as a key to FIG. 11 wherein the numerically labeled blocks and the corresponding functions are set forth as follows.

TABLE 1

| BLOCK | BLOCK CONTENTS |
|---|---|
| 1102 | Start |
| 1104 | Monitor a desired axle torque. |
| 1106 | Receive an engine torque range from a minimum engine torque to a maximum engine torque and an engine speed range from a minimum engine speed to a maximum engine speed. |
| 1108 | Retrieve a plurality of fuel losses. |
| 1110 | Retrieve a plurality of emissions losses. |
| 1112 | Compare respective fuel and emissions losses at each of a plurality of potential engine operating points. |
| 1114 | Select a desired engine operating point within one of the available combustion modes. |
| 1116 | Monitor a desired instantaneous air-fuel ratio corresponding to a desired transient engine operating point. |
| 1118 | Estimate an instantaneous intake air mass. |
| 1120 | Determine a desired instantaneous injected fuel mass to achieve the desired instantaneous air-fuel ratio and translate the desired instantaneous injected fuel mass to a desired torque request. |
| 1122 | Determine an immediate torque request. |

The flowchart starts at block 1102 and proceeds to block 1104. At block 1104, a desired axle torque is monitored based on an operator torque request and vehicle speed. The operator torque request can be in response to an operator input to an accelerator pedal or a brake pedal. The tactical selection module 918 can monitor the desired axle torque 903 determined by the interface module 902.

At block 1106, an engine torque range from a minimum engine torque to a maximum engine torque is received for each of a plurality of available combustion modes. The combustion modes can include the first, second and third combustion modes of FIG. 8, wherein the first combustion mode is always available and the second and third combustion modes are available unless a fault condition exists. An engine speed range from a minimum engine torque to a maximum engine torque is further received for each available combustion mode at block 1106. The tactical selection module 918 of FIG. 9 receives the engine torque and speed ranges from the combustion availability module 904.

At block 1108, a plurality of fuel losses are retrieved for each available combustion mode, each fuel loss corresponding to respective ones of a plurality of engine operating points within the engine torque and speed ranges. The fuel losses can be retrieved by the tactical selection module 918 from the fuel map module 912 of FIG. 9 that stores a plurality of fuel losses for speed-load points of each available combustion mode. The fuel losses can be indicative of BSFC values obtained from FIG. 5.

Referring to block 1110, a plurality of emissions losses are retrieved for each available combustion mode, each emissions loss corresponding to respective ones of the plurality of engine operating points within the engine torque and speed ranges. It will be appreciated that blocks 1108 and 1110 can be performed concurrently. The emissions losses can be retrieved by the tactical selection module 918 from the emissions map module 914 of FIG. 9 that stores a plurality of emissions losses for speed-load points of each available combustion mode. The emissions losses can be indicative of NOx emission values obtained from FIG. 6 and/or be indicative of hydrocarbon emission values obtained from FIG. 7.

Referring to block 1112, the respective fuel and emissions losses are compared at each of a plurality of potential engine operating points within the engine torque and speed ranges of the available combustion modes. One or more of the potential operating points can achieve the desired axle torque solely from engine torque. Additionally or alternatively, one or more of the potential operating points can include non-achieving engine operating points that are utilized to achieve the desired axle torque only when combined with an assigned motor torque provided by the one or more torque machines 40 of FIG. 1.

Referring to block 1114, a desired engine operating point within one of the available combustion modes is selected. The desired engine operating point can be selected by the tactical selection module 918 of FIG. 9. The desired engine operating point corresponds to one of the potential engine operating points having a lowest power loss based on the compared respective fuel and emissions losses. In some embodiments, the power loss can be further based upon a respective energy loss resulting from electrical power required to supply the one or more torque machines for providing an assigned motor torque when the desired engine operating point corresponds to a non-achieving engine operating point. In other embodiments, the power loss can be further based upon a respective transmission spin loss based on a selected gear ratio of the transmission 20 of FIG. 1.

Referring to block 1116, when a transient is determined in the desired engine operating point (e.g., a desired transient engine operating point), a desired instantaneous air-fuel ratio corresponding to the desired engine operating point is determined by the tactical selection module 918 of FIG. 9.

Referring to block 1118, an instantaneous intake air mass is estimated. The estimated intake air mass module 950 can estimate the instantaneous intake air mass. At block 1120, a desired instantaneous injected fuel mass to achieve the desired instantaneous air-fuel ratio based on the estimated instantaneous intake air mass is determined. Thereafter, the desired instantaneous injected fuel mass is translated to a desired torque request.

Referring to block 1122, an immediate torque request is determined based on motor torque capacity and the desired torque request. The immediate torque request can be determined in the tactical execution module 970 of FIG. 9. If the desired axle torque can be met with a required motor torque provided by the one or more torque machines 40 while operating at the desired torque request, the immediate torque request will correspond to the desired torque request. Thus, the motor torque capacity is sufficient. If the motor torque capacity is insufficient to provide the required motor torque, the immediate torque request may be controlled away from the desired torque request as needed to meet the desired axle torque. As aforementioned, the motor torque capacity may be insufficient when the state of charge of the high-voltage electrical system 80 is too low, i.e., below a state of charge threshold. Thereafter, block 1122 translates the immediate torque request to an injected fuel mass. Thus, injected fuel mass, e.g., engine torque, can be controlled in accordance with maintaining a desired air-fuel ratio, wherein any drivability sacrificed can be compensated for by immediate motor torque provided by the one or more torque machines.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for selecting an engine operating point in a multi-mode powertrain system employing a diesel engine and one or more non-combustion torque machines arranged to transfer torque to a driveline via a transmission device, the method comprising:
monitoring a desired axle torque based on an operator torque request and vehicle speed;
monitoring availability of a plurality of combustion modes of the diesel engine;
for each available combustion mode:
receiving an engine torque range from a minimum engine torque to a maximum engine torque,
receiving an engine speed range from a minimum engine speed to a maximum engine speed,
retrieving a plurality of fuel losses, each fuel loss corresponding to respective ones of a plurality of engine operating points within the engine torque and speed ranges,
retrieving a plurality of emissions losses, each emissions loss corresponding to respective ones of the plurality of engine operating points within the engine torque and speed ranges, and
at each of a plurality of potential engine operating points within the engine torque and speed ranges of the available combustion modes, comparing the respective fuel and emissions losses;
selecting a desired engine operating point within one of the available combustion modes, the desired engine operating point corresponding to one of the potential engine operating points having a lowest power loss based on the compared respective fuel and emissions losses; and
controlling the diesel engine to said desired engine operating points by controlling actuators to control combustion parameters in said one of the available combustion modes.

2. The method of claim 1, wherein each of the plurality of potential engine operating points within the engine torque and speed ranges of the available combustion modes are utilized to achieve the desired axle torque.

3. The method of claim 2, further comprising:
for each respective potential engine operating point that does not achieve the desired axle torque, assigning a respective motor torque from the one or more electric machines to achieve the desired axle torque when combined with the respective potential engine operating point.

4. The method of claim 2, wherein each of the plurality of potential engine operating points correspond to respective ones of a plurality of gear ratios of the transmission device, each potential engine operating point utilized to achieve the desired axle torque when multiplied by one of the plurality of gear ratios of the transmission device.

5. The method of claim 1, wherein comparing the respective fuel and emissions losses comprises:
summing the respective fuel and emissions losses; and
determining a respective power loss based on the summing.

6. The method of claim 5, further comprising:
at each of the plurality of potential engine operating points:
determining a respective energy loss based on electrical power required to supply the one or more torque machines providing motor torque, wherein the respective power loss is further based on the respective energy loss.

7. The method of claim 5, further comprising:
at each of the plurality of potential engine operating points:
determining a respective transmission spin loss based on a selected gear ratio of the transmission, wherein the respective power loss is further based on the respective transmission spin loss.

8. The method of claim 1, further comprising:
determining an injected fuel mass to achieve the desired engine operating point; and
adjusting intake air mass to achieve a desired air-fuel ratio at the desired engine operating point based on the determined injected fuel mass.

9. The method of claim 8, wherein adjusting the intake air mass to achieve the desired air-fuel ratio comprises:
adjusting at least one of exhaust gas recirculation entering the diesel engine, intake air pressure and throttle opening to achieve the desired air-fuel at the desired engine operating point within the one of the available combustion modes based on the determined injected fuel mass.

10. The method of claim 8, wherein the desired air-fuel ratio at the desired engine operating point is based on a desired balance of emissions efficiency, fuel efficiency, noise, vibrations and harshness.

11. The method of claim 1, further comprising:
if a transient in the desired engine operating point is determined, monitoring a desired instantaneous air-fuel ratio corresponding to the desired engine operating point;
estimating an instantaneous intake air mass;
determining a desired instantaneous injected fuel mass to achieve the desired instantaneous air-fuel ratio based on the estimated instantaneous intake air mass; and
translating the desired instantaneous injected fuel mass to a desired torque request.

12. The method of claim 11, further comprising:
monitoring motor torque capacity;
determining an immediate torque request to achieve the desired axle torque based on the monitored motor torque capacity and the desired torque request, wherein the immediate torque request corresponds to the desired torque request when the motor torque capacity is sufficient for achieving the desired axle torque when combined with the desired torque request.

13. The method of claim 12, further comprising:
a third combustion mode comprising
an engine torque and speed range decreased from operation in the first combustion mode and increased from operation in the second combustion mode,
emissions losses decreased from operation in the first combustion mode and increased from operation in the second combustion mode,
fuel losses increased from operation in the first combustion mode and decreased from operation in the second combustion mode, and
drivability decreased from operation in the first combustion mode and increased from operation in the second combustion mode.

14. The method of claim 11, wherein the desired instantaneous air-fuel ratio always remains below a smoke limit of the diesel engine.

15. The method of claim 1, wherein the plurality of combustion modes comprise:
a first combustion mode that is always available; and
a second combustion mode comprising a decreased engine torque and speed range, decreased emissions losses, increased fuel losses and decreased drivability from operation in the first combustion mode.

16. The method of claim 15, wherein the second combustion mode is not available when a fault conditions exits, the fault condition comprising at least one of:
   a fault in in-cylinder pressure;
   a fault in air control to the engine; and
   environmental conditions indicating that operation in the second combustion mode is not desirable.

17. The method of claim 1, wherein the retrieved plurality of emissions losses correspond to magnitudes of at least one of nitrous oxide and hydrocarbons, wherein higher emissions losses are indicative of higher magnitudes of nitrous oxide and hydrocarbons.

18. Method for selecting a desired engine torque in a multi-mode powertrain system employing a diesel engine and one or more electric machines arranged to transfer torque to a driveline via a transmission device, the method comprising:
   monitoring a desired axle torque based on an operator torque request and a present vehicle speed;
   monitoring availability of at least two combustion modes of the diesel engine, one of the combustion modes having a higher emissions efficiency than the other one or more combustion modes;
   for each available combustion mode:
      receiving engine torque and speed ranges;
      retrieving a plurality of fuel consumption values, each fuel consumption value corresponding to respective ones of a plurality of engine operating points within the engine torque and speed ranges;
      retrieving a plurality nitrous oxide values, each nitrous oxide value corresponding to respective ones of the plurality of engine operating points within the engine torque and speed ranges, and
      at each of a plurality of potential engine operating points within the engine torque and speed ranges of the available combustion modes, summing the respective fuel consumption value and the respective nitrous oxide value;
   selecting the desired engine torque within one of the available combustion modes, the desired engine torque corresponding to one of the potential engine operating points having a lowest summed value based on the summing the respective fuel consumption value and the respective nitrous oxide value; and
   controlling the diesel engine to said one of the potential engine operating points by controlling actuators to control combustion parameters in said one of the available combustion modes.

19. The method of claim 18, further comprising:
   if a transient in the desired engine torque is determined, monitoring a desired instantaneous air-fuel ratio corresponding to the desired transient engine operating point;
   estimating an instantaneous intake air mass;
   determining a desired instantaneous injected fuel mass to achieve the desired instantaneous air-fuel ratio based on the estimated instantaneous intake air mass;
   translating the desired instantaneous injected fuel mass to a desired torque request;
   monitoring motor torque capacity; and
   determining an immediate torque request to achieve the desired axle torque based on the monitored motor torque capacity and the desired torque request, wherein the immediate torque request corresponding to the desired torque request when motor torque capacity is sufficient for achieving the desired axle torque when combined with the desired torque request.

\* \* \* \* \*